(12) United States Patent
Goenka et al.

(10) Patent No.: US 10,592,543 B2
(45) Date of Patent: Mar. 17, 2020

(54) SUB-ACCOUNT MANAGEMENT

(71) Applicant: Oath Inc., New York, NY (US)

(72) Inventors: Mohit Goenka, Santa Clara, CA (US); Ashish Khushal Dharamshi, Sunnyvale, CA (US); Nikita Varma, Milpitas, CA (US)

(73) Assignee: Oath Inc., New York, NY (US)

( * ) Notice: Subject to any disclaimer, the term of this patent is extended or adjusted under 35 U.S.C. 154(b) by 183 days.

(21) Appl. No.: 15/692,149

(22) Filed: Aug. 31, 2017

(65) Prior Publication Data
US 2019/0065585 A1  Feb. 28, 2019

(51) Int. Cl.
| | |
|---|---|
| *G06F 16/00* | (2019.01) |
| *G06F 16/335* | (2019.01) |
| *G06Q 10/00* | (2012.01) |
| *G06F 21/10* | (2013.01) |
| *G06Q 50/00* | (2012.01) |
| *G06F 21/41* | (2013.01) |

(52) U.S. Cl.
CPC ............ *G06F 16/337* (2019.01); *G06F 21/10* (2013.01); *G06F 21/41* (2013.01); *G06Q 10/00* (2013.01); *G06Q 50/01* (2013.01); *G06F 2221/2113* (2013.01)

(58) Field of Classification Search
CPC .................. G06F 16/337; G06F 21/10; G06F 2221/2113; G06F 16/2462; G06F 16/9014; G06F 16/2455; G06F 16/9026; G06F 16/3347; G06F 16/24575; G06F 16/1756; G06F 16/1748; G06F 17/30619; G06F 17/3033; G06F 16/951; G06F 16/00; G06F 17/30327; G06F 17/30365; G06F 17/30513; G06F 21/604; G06F 16/24578; G06F 16/382; G06F 16/3346; G06F 17/2785; G06F 17/2828; G06F 17/3069; G06F 17/30528; G06F 17/30401; G06F 17/30153; G06F 17/30371; G06F 12/0802; G06F 17/30; G06Q 50/01; G06Q 10/00; H04L 51/12; H04L 63/105; H04L 67/2842; G06G 16/243

See application file for complete search history.

(56) References Cited

U.S. PATENT DOCUMENTS

| | | | | |
|---|---|---|---|---|
| 7,954,704 | B1 * | 6/2011 | Gephart | G06Q 20/3572 705/72 |
| 2005/0010483 | A1 * | 1/2005 | Ling | G06Q 20/10 705/39 |
| 2009/0037333 | A1 * | 2/2009 | Flitcroft | G06Q 20/00 705/44 |

(Continued)

*Primary Examiner* — Anh Ly
(74) *Attorney, Agent, or Firm* — Cooper Legal Group, LLC

(57) ABSTRACT

One or more computing devices, systems, and/or methods for sub-account management are provided. For example, a user may have a primary account with a service, such as a social network service, an email service, a bank service, etc. The user may create a sub-account connected/linked to the primary account. The primary account comprises and directly controls the sub-account. For example, the primary account can access content, sub-account settings, and/or sub-account activity of the sub-account from the primary account. The sub-account can be automatically disconnected from the primary account based upon a disconnect condition being satisfied.

20 Claims, 10 Drawing Sheets

(56) References Cited

U.S. PATENT DOCUMENTS

| | | | | |
|---|---|---|---|---|
| 2009/0144193 A1* | 6/2009 | Giordano | ............... | G06Q 20/04 |
| | | | | 705/39 |
| 2009/0307117 A1* | 12/2009 | Greiner | ................. | G06Q 30/04 |
| | | | | 705/34 |
| 2011/0010254 A1* | 1/2011 | Chenot | ................ | G06Q 20/204 |
| | | | | 705/17 |
| 2012/0191585 A1* | 7/2012 | Lefebvre | ................ | G06Q 10/10 |
| | | | | 705/35 |
| 2012/0330837 A1* | 12/2012 | Persaud | ................ | G06Q 20/20 |
| | | | | 705/44 |
| 2013/0072160 A1* | 3/2013 | Lawson | ................ | H04L 63/102 |
| | | | | 455/411 |
| 2013/0249680 A1* | 9/2013 | Goto | ..................... | B60Q 5/008 |
| | | | | 340/425.5 |

* cited by examiner

US 10,592,543 B2

SUB-ACCOUNT MANAGEMENT

BACKGROUND

Many services allow users to create accounts with such services. In an example, a user may create an email account with an email service in order to send and receive emails. In another example, the user may create an account with a bank service in order to access bank account information of bank accounts maintained for the user by a bank. In this way, the user may create accounts with a variety of different services, such as a social network service, a mobile phone provider service, a shopping website, etc.

The user of a service may want to monitor usage of the service by another user, such as a child, friend, employee, etc. Unfortunately, the user may be unable to directly control or monitor usage of the service by the other user. For example, a parent may be unable to adequately control or monitor usage of a social network service by a child. Thus, the parent may have to rely on logging into a social network account of the child in order to review activity by the child.

SUMMARY

In accordance with the present disclosure, one or more computing devices and/or methods for sub-account management are provided. In an example, a user may maintain a primary account with a service, such as a social network service. The user can view content such as social network posts, change account settings, and/or create a sub-account through a primary account interface. The primary account interface may comprise an app, a user interface, a website, an operating system, or some other interface provided to the primary user such as in response to the primary user logging into the primary account with the service. Responsive to receiving a create command through the primary account interface to create a sub-account connected to the primary account, a sub-account creation interface is displayed through the primary account interface. The sub-account is created based upon input received through the sub-account creation interface. The input may pertain to a user name, password, sub-account settings, disconnect conditions (e.g., when a sub-account user becomes 18 years old, the sub-account will be automatically disconnected from the primary account to become a new primary account with the same content as the sub-account), and/or other information used to create, monitor, and/or control the sub-account from the primary account.

The sub-account is connected/linked to the primary account. In an example, the sub-account is part of the primary account and thus is comprised within the primary account. For example, if the primary account is deleted, then the sub-account would be deleted because the sub-account is part of the primary account unless deletion of the primary account is set as a disconnect condition. The primary account can directly control and manage the sub-account from the primary account such as from the primary account interface. For example, the primary account can access content of the sub-account (e.g., view messages, social network posts, calendar data, movies, etc.), modify the content (e.g., delete a message), modify sub-account settings (e.g., block the opening of attachments, set a daily spending limit for a bank account, block posting images, set a background image for a mobile device, restrict streaming media during certain times, etc.). In an example, the accounts may be associated with particular devices, such as where the primary account is for a first mobile device, television, or other computing device and the sub-account is for a second mobile device, television, or other computing device. Thus, the primary account can be used through the first mobile device, television, or other computing device to directly modify content and/or settings of the second mobile device, television, or other computing device.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
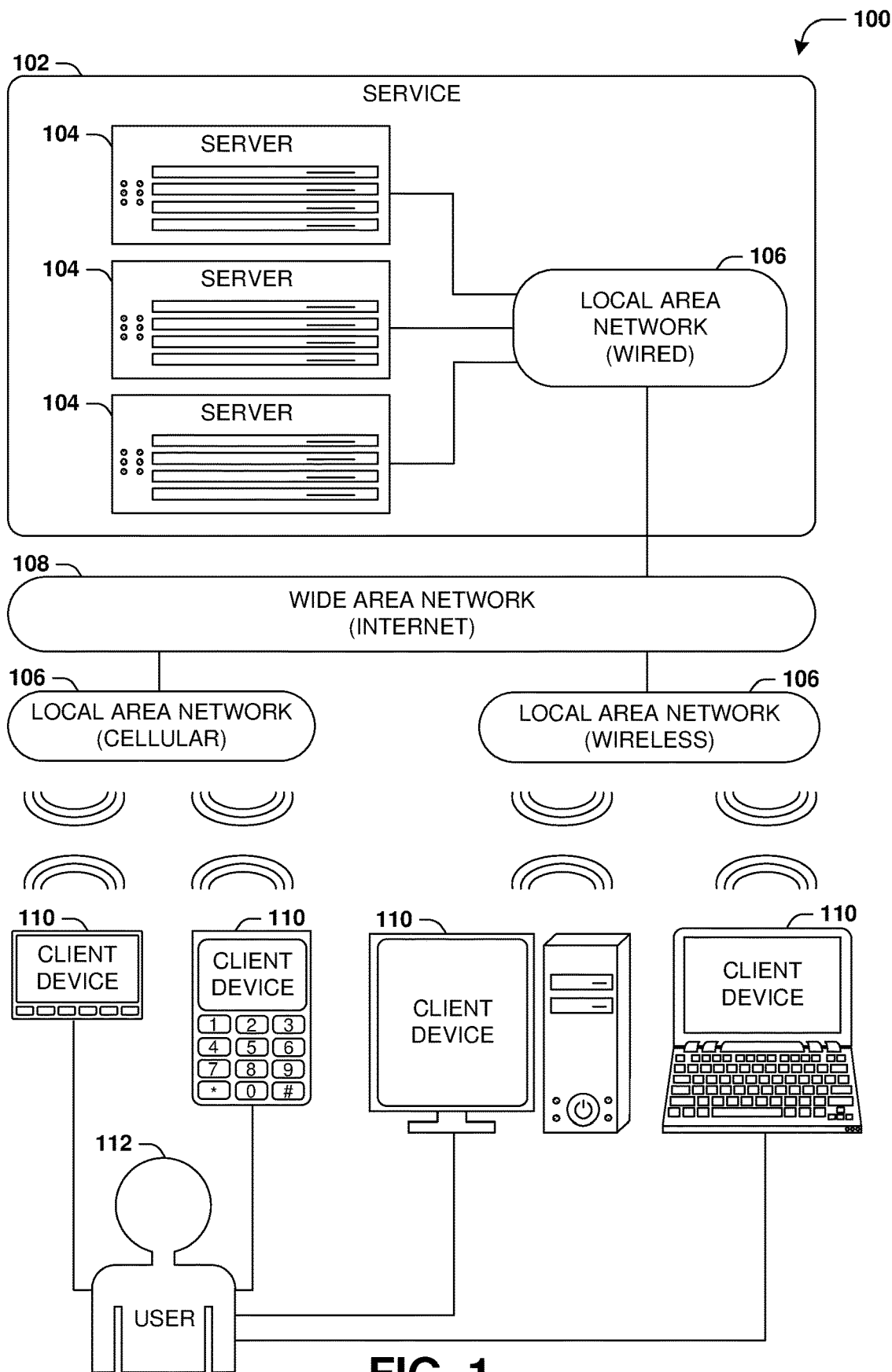
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
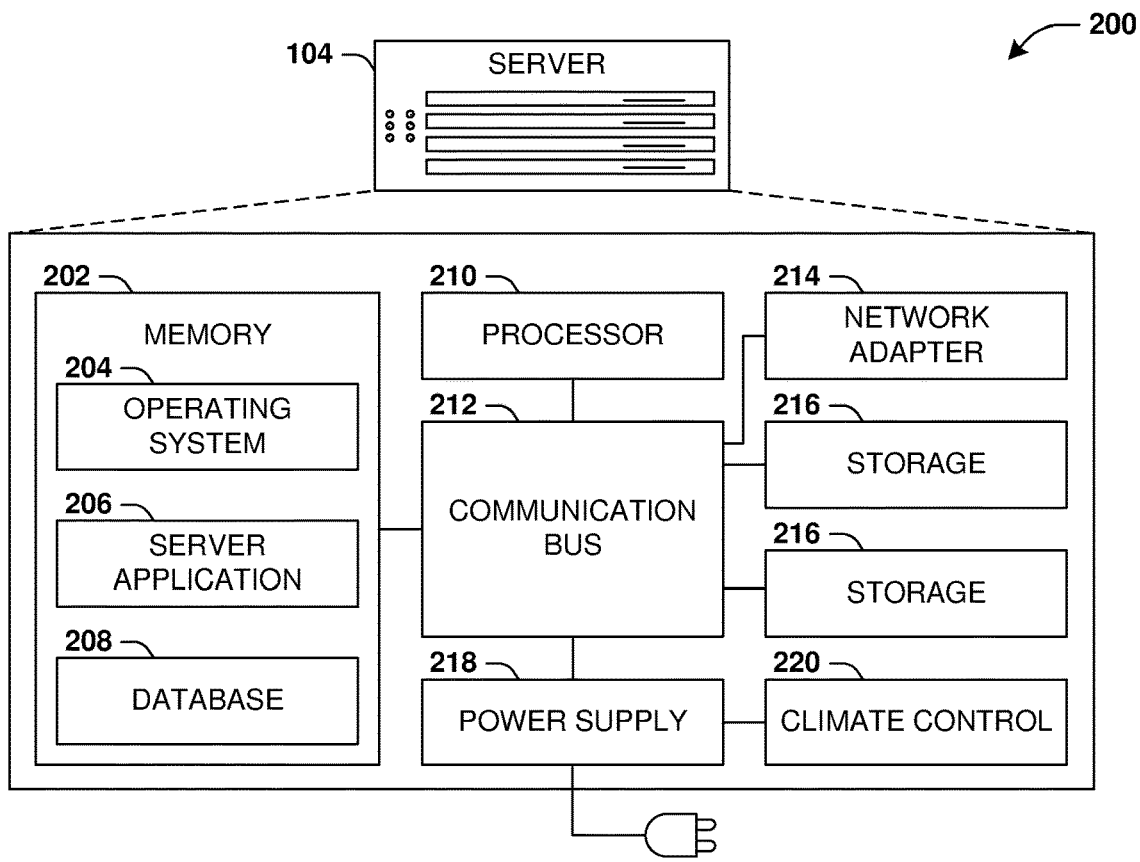
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic architecture diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
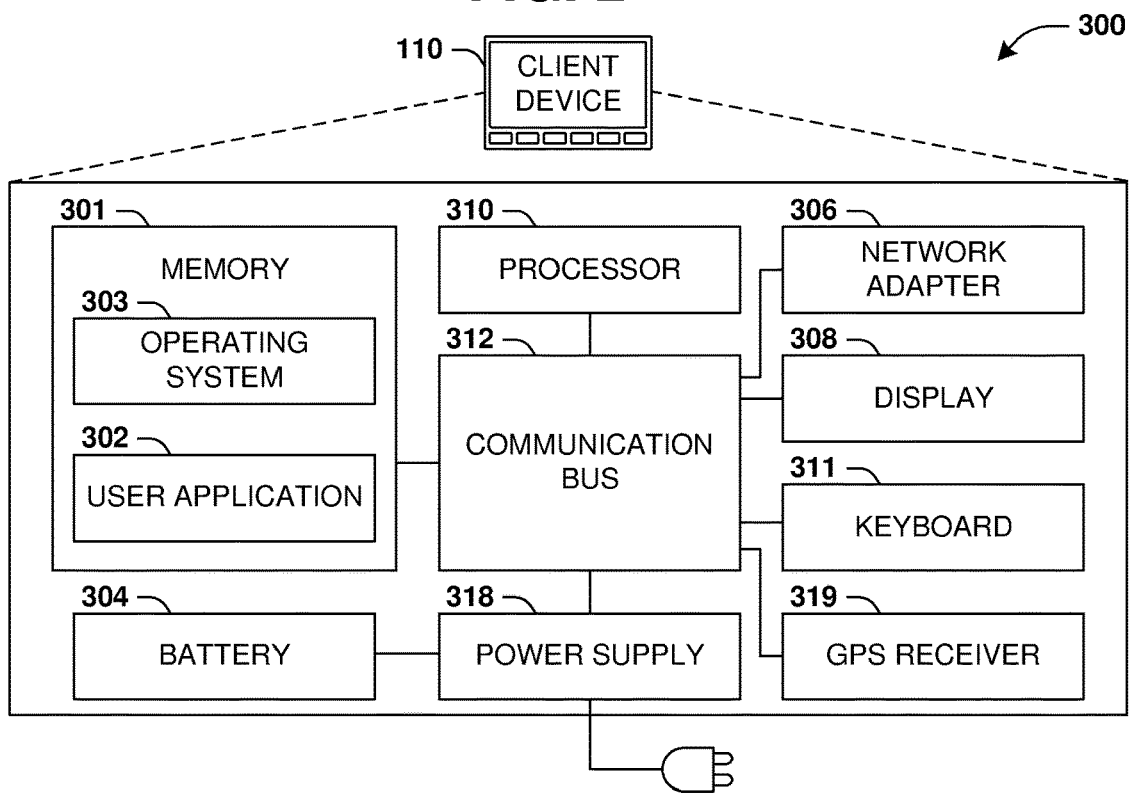
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for sub-account management are provided. For example, a primary user having a primary account with a service (e.g., a parent having a primary social network account with a social network service) may create a sub-account that is part of and connected to the primary account. For example, the parent may create through the primary social network account (e.g., while logged into the primary social network account) the sub-account for a child. The sub-account is connected/linked to the primary account such that the parent can view, modify, and/or interact with content of the sub-account (e.g., view social network messages, view social network posts, delete a post, subscribe to a certain feed, create a post, etc.), change settings of the sub-account (e.g., block a particular user, set a privacy setting, change a password, change a profile picture, etc.), and/or otherwise directly manage and control the sub-account while logged into the primary social network account (e.g., access the content and sub-account settings of the sub-account through a primary user interface used by the primary social network account to access content and settings of the primary account). Thus, the parent can directly manage and control the sub-account from the primary social network account, such as without the need for logging into the sub-account.

The ability to directly access, manage, and control the sub-account from the primary account provides an improvement and significantly more over conventional techniques for access control because the primary account has direct control over the sub-account from the primary account. The primary account can directly view and manipulate content and sub-account settings of the sub-account from the primary account, and also view activity by the sub-account with the service (e.g., login and logout times, content shared through the sub-account, password changes, messages sent and received, devices used to access the service, location of such devices, etc.).

This provides for improved security, safety, and content control over the sub-account, such as where the parent wants to control access of the child to digital content over a network from a computer device. In an example where the primary account and the sub-account are tied to different devices (e.g., logins for mobile devices of the parent and child), the primary account can directly affect operation of a mobile device associated with the sub-account, such as modifying/manipulating a ringtone setting, a background image, setting a data limit, changing a password, and/or a variety of other settings and operation of the mobile device (e.g., remote access to directly modify operation of the mobile device such as an operating system of the mobile device).

Figure 4:
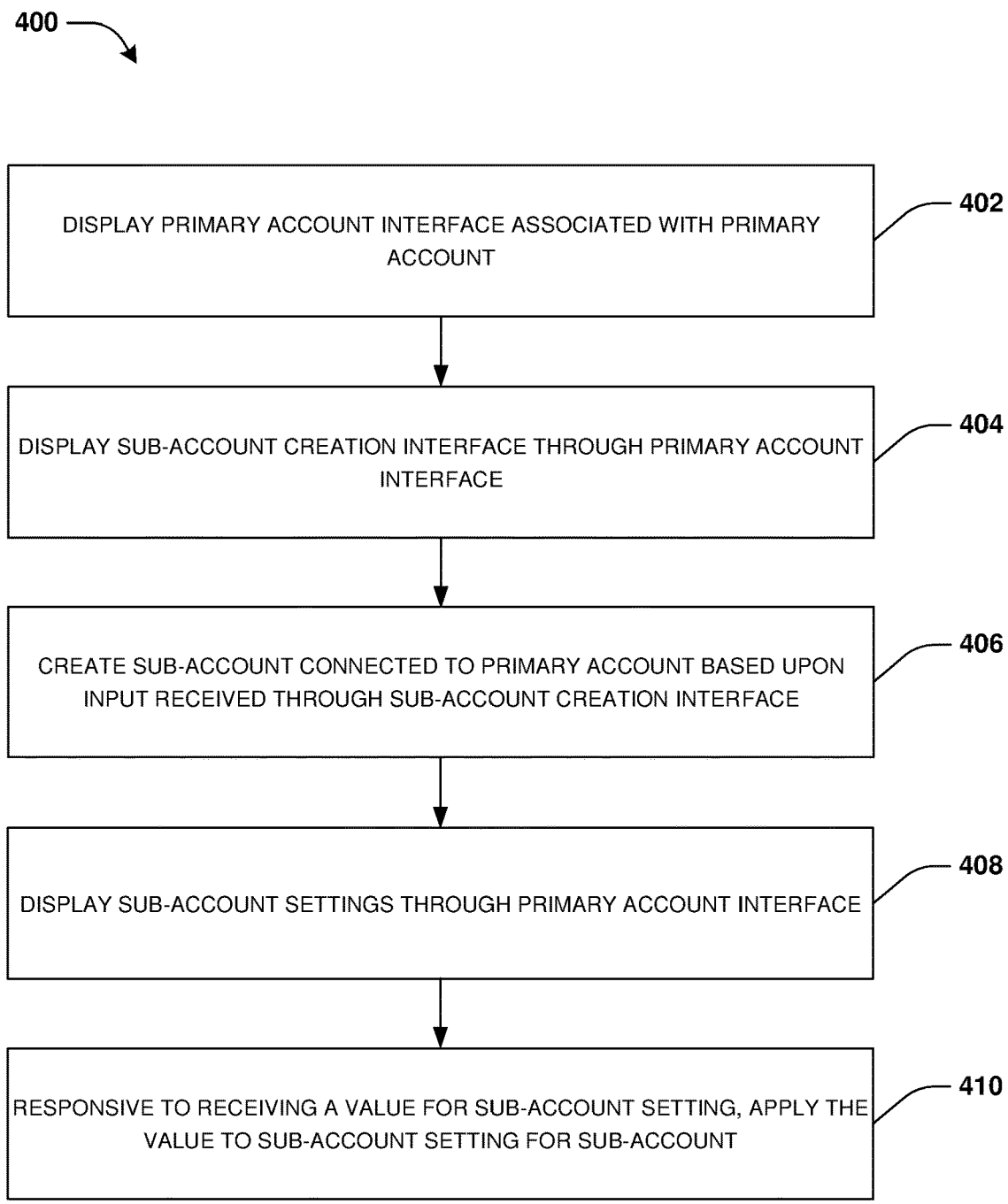
FIG. 4 is a flow chart illustrating an example method for sub-account management.

An embodiment of sub-account management is illustrated by an example method 400 of FIG. 4. At 402, a primary account interface may be displayed/rendered through a display of a computing device for a primary user. The primary user may be associated with a primary account with a service. For example, the primary account may be associated with a media service that provides access to media content (e.g., music, movies, streaming content, etc.), a social network service, a cloud service, a mobile phone service (e.g., a login to a mobile device operating system), a vehicle navigation service, an email service, an e-commerce shopping service (e.g., an account with a shopping website), a bank account service, a television service (e.g., a login to a television interface), and/or a wide variety of other services for which a user may maintain an account. The primary account interface may refer to any user interface through which content, settings, and/or other information is provided for the primary account (e.g., a social network app after login by the primary user, a shopping website after login by the primary user, a mobile operating system after login by the primary user, etc.).

At 404, a create command may be received through the primary account interface for creating a sub-account connected/linked to the primary account. For example, a create sub-account user interface element may be populated within the primary account interface, such as through a settings menu. In this way, the primary user may interact with the create sub-account user interface element to invoke the create command. Accordingly, a create sub-account interface may be displayed through the primary account interface.

The primary user may specify various parameters for the creation of the sub-account through the create sub-account interface. For example, the primary user may specify a login name, login security credentials, an avatar, a profile image, and/or other demographic information for the sub-account. The primary user may also specify initial sub-account settings, such as when the sub-account is allowed to be used, a data usage limit, a spending limit for a bank account (e.g., the primary account may be associated with a bank account of the primary user and the sub-account may be part of the primary account such as where a sub-account user may be issued a debit card linked to the bank account), a daily withdrawal limit for the bank account, an expiration date for use of the bank account, etc. The primary user may also specify email settings and restrictions (e.g., images within emails are to be blocked, a limit to a number of emails allowed to be sent, etc.), social network settings and restrictions (e.g., a limit to a number of social network friends, a restriction that photos are not allowed to be shared, a limit to when the sub-account may be used, etc.), and/or a variety of other sub-account settings for the sub-account.

The primary user may specify television settings and restrictions (e.g., times during which certain channels or streaming services may be used, what shows or movies or genres may be streamed, etc.), mobile devices settings and restrictions (e.g., a restriction from making purchases over a certain amount from an app store, a restriction of a number of purchases from the app store, a restriction to block in-app purchases, a ringtone setting, a background image, etc.), vehicle settings and restrictions (e.g., times during which the vehicle may be started for a smart vehicle requiring user login before being started, a vehicle operating speed limit, enable logging of vehicle locations, etc.).

The primary user may specify disconnect conditions specifying that the sub-account is to be disconnected from the primary account upon satisfaction of a condition. The condition may comprise an age condition (e.g., the sub-account user becoming 18 or any other specified age), a point in time (e.g., 3 years for a current date), a number of logins (e.g., after 50 logins each on different days), a weather condition, an occurrence of an event (e.g., a sporting event, a high school graduation, an amount of money saved into a savings account, a birthday, a worked project being completed, conclusion of an election, etc.), etc. In an example, the service may specify defined disconnect conditions, such as an age of the sub-account. In this way, the sub-account is disconnected from the primary account upon satisfaction of the condition. When disconnected, the sub-account may be transformed into a new primary account. The primary account may be unable to manage or control the new primary account. The new primary account may retain the same content, sub-account settings, and/or other information associated with the sub-account. In an example, any restrictions or limits previously placed upon the sub-account by the primary account may be removed.

At 406, the sub-account is created based upon the input received through the sub-account creation interface. The sub-account is part of the primary account such that the primary account can directly manage, access, and control the sub-account from the primary account (e.g., without the need to log into the sub-account, without the need to access a device associated with the sub-account, etc.). Thus, the primary user can access content of the sub-account (e.g., view emails of the sub-account, view vehicle driving statistics, view social network posts, view purchase history, view shopping cart history, send emails, make purchases, share an image, create a social network post, and/or view or modify any other content of the sub-account) from the primary account. The primary user can access, view, and/or modify the content through the primary account interface (e.g., through a device associated with the primary account and/or through an app, user interface, or website provided in response to the primary user logging into the primary account).

The primary account may view and/or modify sub-account settings of the sub-account such as through the primary account interface (e.g., the primary user may specify a value for a sub-account setting, such as a password, a background image, a device volume, a channel restriction, a data restriction, a purchase restriction, etc.). For example, sub-account settings of the sub-account may be displayed through the primary account interface, at 408. Responsive to receiving a value for a sub-account setting through the primary account interface, the value is applied to the sub-account setting for the sub-account, at 410. In this way, the primary account interface may be populated with content and/or settings of the primary account and/or the sub-account (e.g., the primary user may access a social network feed of the primary account and a social network feed of the sub-account within the same user interface).

Content of the sub-account may be provided to the sub-account user through a sub-account interface. For example, the sub-account user may log into the sub-account through an app, user interface, television interface, mobile device interface, a website, a smart vehicle interface, a wearable device interface, or any other interface using login credentials of the sub-account. In an example, the sub-account user does not have access to content and settings of the primary account. In an example, modification of sub-account settings by the sub-account user will not disconnect the sub-account from the primary account (e.g., a password change by the sub-account user for the sub-account does not affect access or control over the sub-account by the primary account). In an example, the sub-account is restricted from disconnecting from the primary account.

Activity of the sub-account user with the service may be tracked, such as stored within a database, a log file, or any other data structure. The primary account may be provided with access to view the sub-account activity of the sub-account, such as vehicle speed information, login times, social network posts, password changes, background image changes, execution of an application, sending of a social network message, installation of an application, a song being played, a video being played, etc.

In an example, the primary account is associated with a first device (e.g., a cellphone, mobile device, wearable device, television, tablet, etc. of a parent) and the sub-account is associated with a second device (e.g., a cellphone, mobile device, wearable device, television, tablet, etc. of a child). The primary account through the first device may control or modify the sub-account being accessed at the second device, thus remotely affecting operation of the second device such as through commands sent over a network from the first device to the service and to the second device or directly from the first device to the second device. For example, the primary account interface at the first device may be used to set a ringtone, a background image, a data limit, a restriction on executing an application, etc. for the sub-account, which may be implemented at the second device for the sub-account. Thus, the first device may send commands that are implemented for the sub-account accessed by the second device.

In an example, the primary account may submit a request to transfer the sub-account from the primary account to a second primary account (e.g., one parent may request to transfer control of the child's sub-account to the other parent). Accordingly, the sub-account may be disconnected from the primary account and connected to the second primary account. The second primary account may be provided with access to view or modify content of the sub-account, sub-account settings of the sub-account, and/or account activity of the sub-account.

Figure 5:
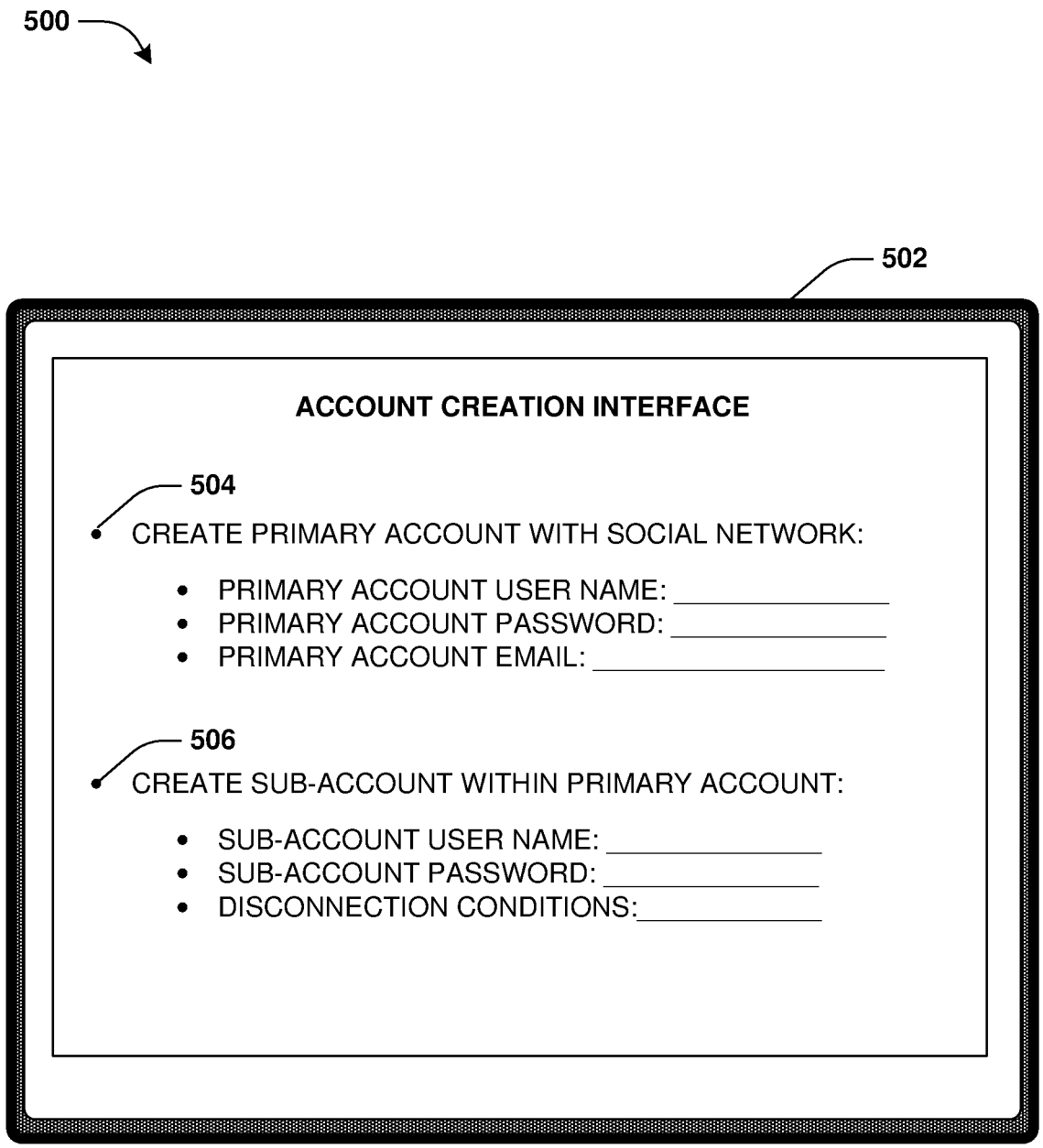
FIG. 5 is a component block diagram illustrating an example system for sub-account management, where a primary account and a sub-account are created.

FIG. 5 illustrates an example of a system 500 for sub-account management. A primary user may use a primary device 502 to create a primary account with a service through an account creation interface, such as to create a primary social network account with a social network. The account creation interface may be populated with primary account creation options 504. The primary user may specify a user name, password, email address, and/or other information through the primary account creation options 504 for creating the primary social network account.

The account creation interface may be populated with sub-account creation options 506 that the primary user may optionally use to create a sub-account connected to the primary account. For example, the primary user may specify a user name, a password, disconnection conditions, and/or other information through the sub-account creation options 506 provided through the account creation interface. In this way, both the primary account and the sub-account are created through the account creation interface based upon input received through the primary account creation options 504 and/or the sub-account creation options 506. Thus, the primary account is created to comprise and control the sub-account.

Figure 6:
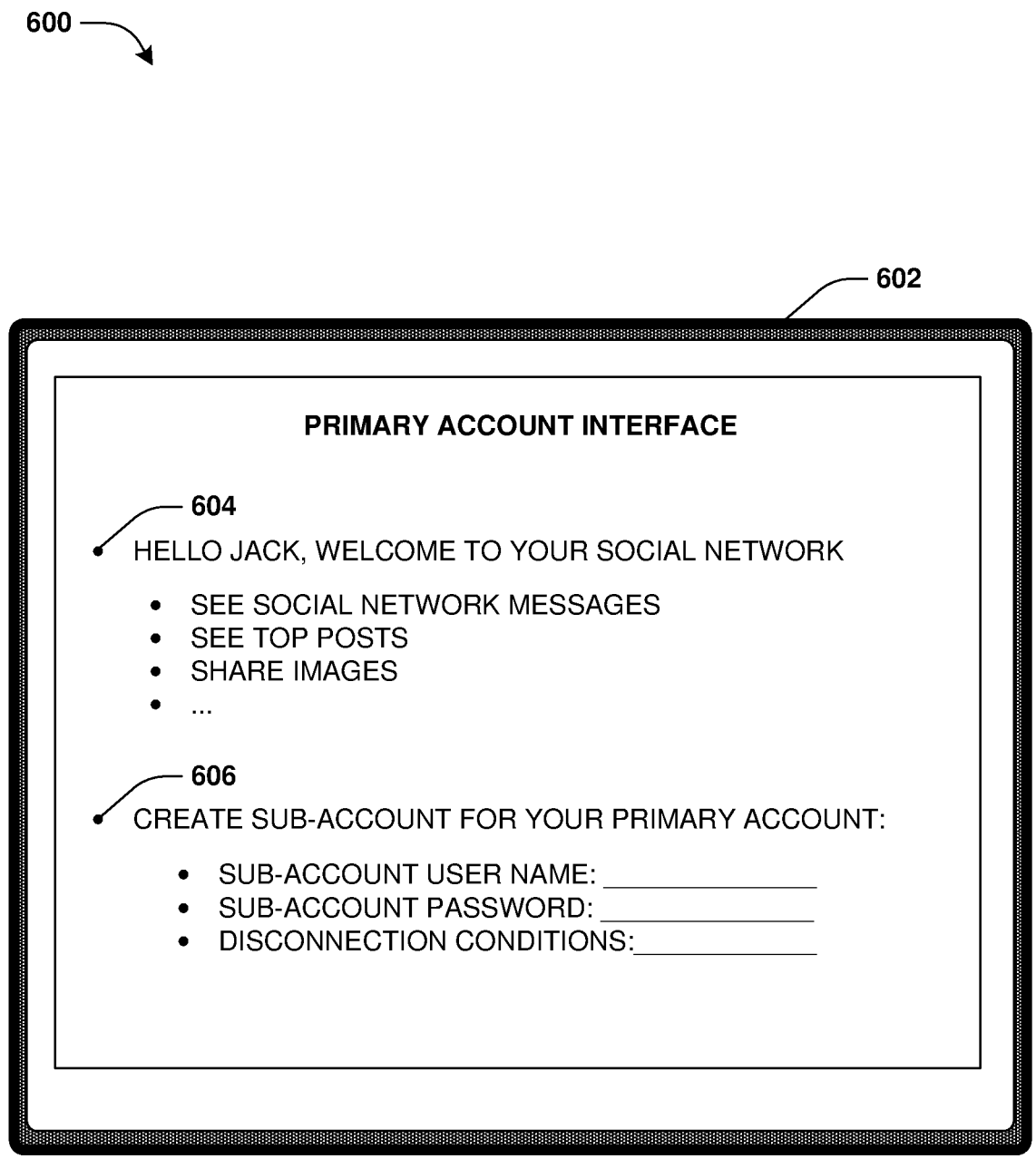
FIG. 6 is a component block diagram illustrating an example system for sub-account management, where a sub-account is created.

FIG. 6 illustrates an example of a system 600 for sub-account management. A primary user may use a primary device 602 to access a primary account interface associated with a primary account with a social network service. The primary account interface may correspond to a user interface, an app, a website, or other interface populated with content associated with the primary account 604 such as after the primary user has logged into the primary account. For example, the primary user may be able to view social network messages and posts, share images, create posts, etc. through the primary account interface.

The primary user may be able to create a sub-account connected to the primary account through the primary account interface. For example, a create sub-account interface 606 may be displayed through the primary account interface. Thus, while having access to content or settings of the primary account, the primary user can define and create the sub-account, such as by inputting a user name, a password, disconnect conditions, and/or other information/parameters used to define the sub-account through the create sub-account interface 606.

Figure 7:
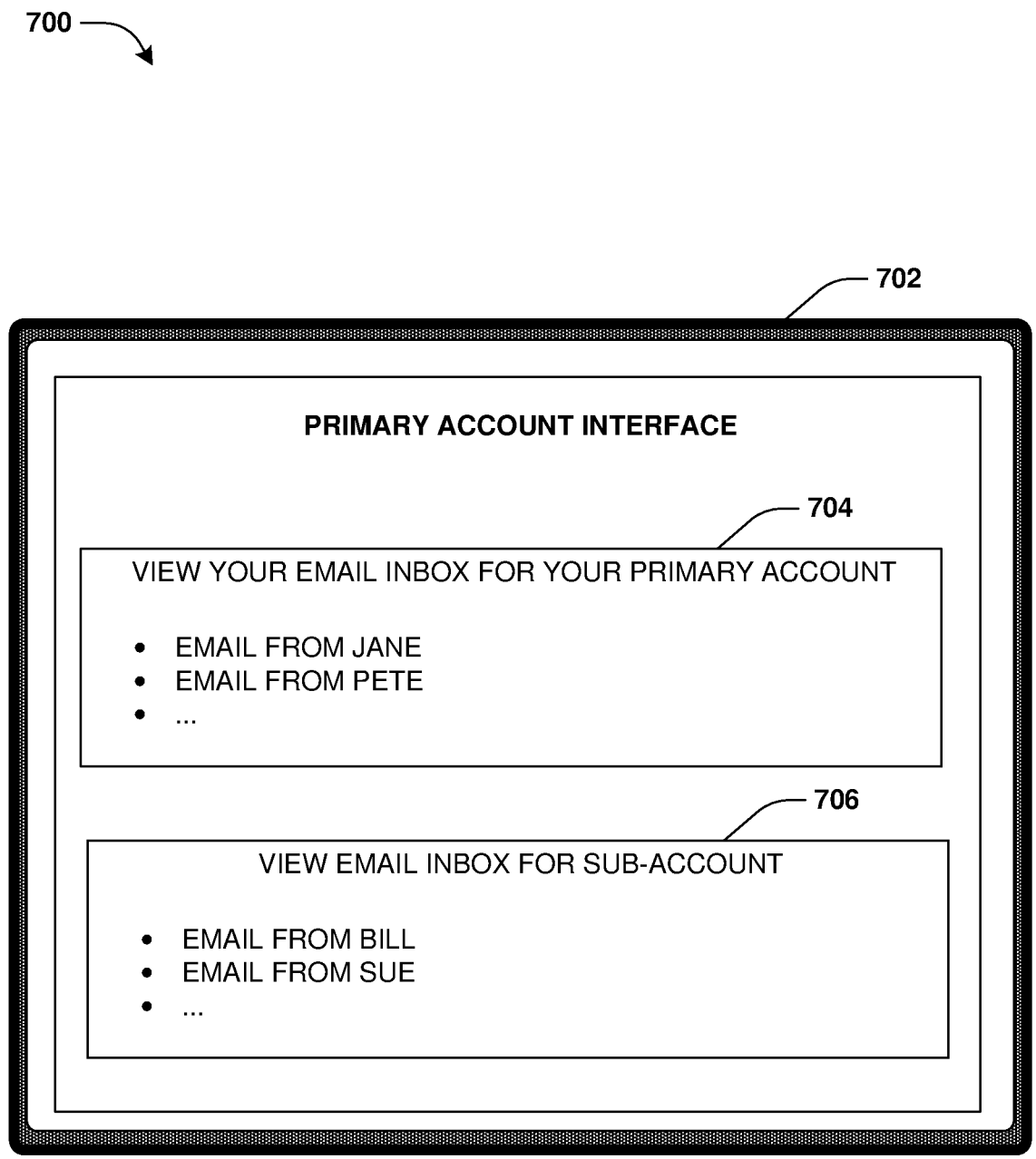
FIG. 7 is a component block diagram illustrating an example system for sub-account management, where a primary account can view, modify, delete, and/or create content of a sub-account.

FIG. 7 illustrates an example of a system 700 for sub-account management. A primary user may use a primary device 702 to access a primary account interface associated with a primary account with an email service. The primary account interface may correspond to a user interface, an app, a website, or other interface populated with content associated with the primary account 704 such as after the primary user has logged into the primary account. For example, the primary user may be able to view emails, send emails, and/or perform other email management operations through the primary account interface.

The primary account interface may be populated with content of the sub-account 706. For example, the primary user through the primary account interface may be able to view emails of the sub-account, send emails from the sub-account, and/or perform other email management operations for the sub-account through the primary account interface. The primary user may be able to view content as it would be displayed to a sub-account user through a sub-account interface. In this way, a single interface, such as the primary account interface, may be used by the primary user to access (e.g., view content, modify content, create content, delete content, etc.) both content of the primary account and the sub-account.

Figure 8:
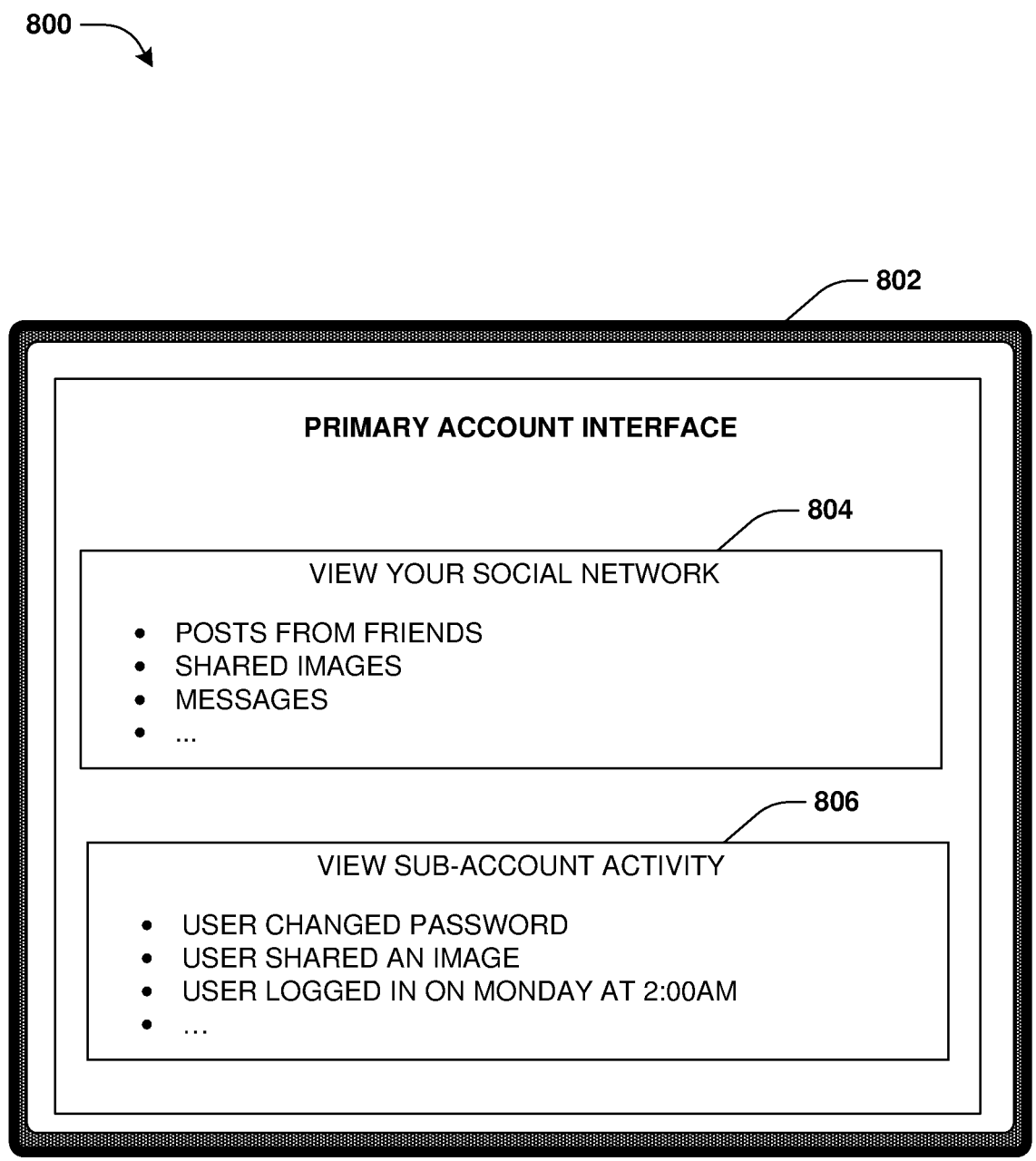
FIG. 8 is a component block diagram illustrating an example system for sub-account management, where a primary account can view sub-account activity of a sub-account.

FIG. 8 illustrates an example of a system 800 for sub-account management. A primary user may use a primary device 802 to access a primary account interface associated with a primary account with a social network service. The primary account interface may correspond to a user interface, an app, a website, or other interface populated with content associated with the primary account 804 such as after the primary user has logged into the primary account. For example, the primary user may be able to view social network messages and posts, share images, create posts, etc. through the primary account interface.

The primary account interface may be populated with sub-account activity of the sub-account 806. For example, the primary user through the primary account interface may be able to view activity by the sub-account user, such as a password change action, an image share action, a user login action, etc. In this way, a single interface, such as the primary account interface, may be used to view content of the primary account and the sub-account activity of the sub-account 806.

Figure 9:
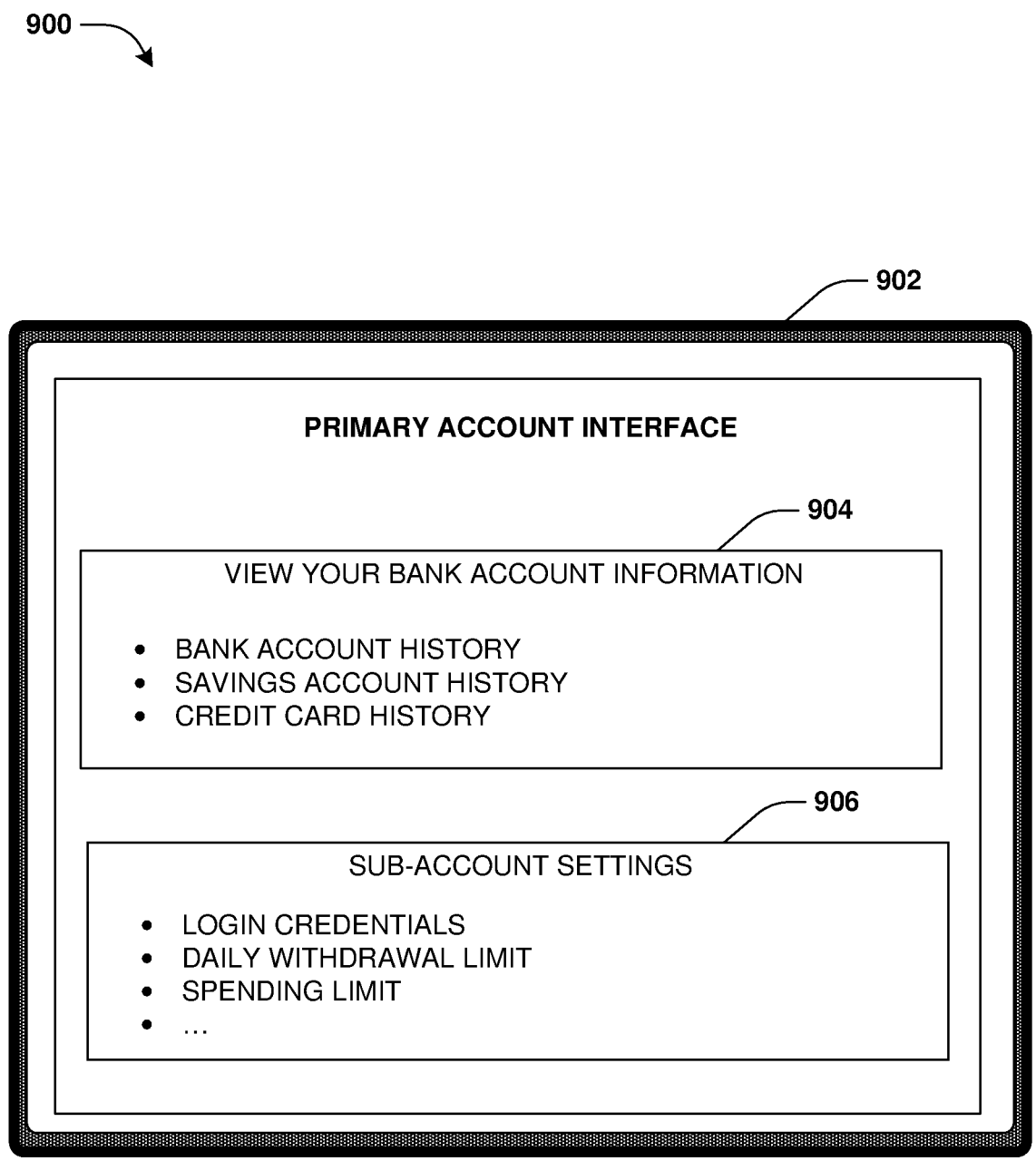
FIG. 9 is a component block diagram illustrating an example system for sub-account management, where a primary account can view and/or modify sub-account settings of a sub-account.

FIG. 9 illustrates an example of a system 900 for sub-account management. A primary user may use a primary device 902 to access a primary account interface associated with a primary account with a bank service. The primary account interface may correspond to a user interface, an app, a website, or other interface populated with content associated with the primary account 904 such as after the primary user has logged into the primary account. For example, the primary user may be able to view a bank account history, savings account history, credit card history, and/or other bank account information. The primary user may be able to perform actions, such as submit a payment, transfer funds, order checks, etc. through the primary account interface.

The primary user may have created a sub-account with the bank service for a sub-account user. The primary user may be able to specify sub-account settings 906 through the primary account interface 902 to apply to the sub-account. For example, the primary user may specify login credentials for the sub-account, a daily withdrawal limit for the sub-account (e.g., $100 withdrawal limit), a spending limit (e.g., a daily, weekly, or monthly spending limit), etc. In this way, a single user interface, such as the primary account interface, may be used to manage and control the primary account and the sub-account.

Figure 10:
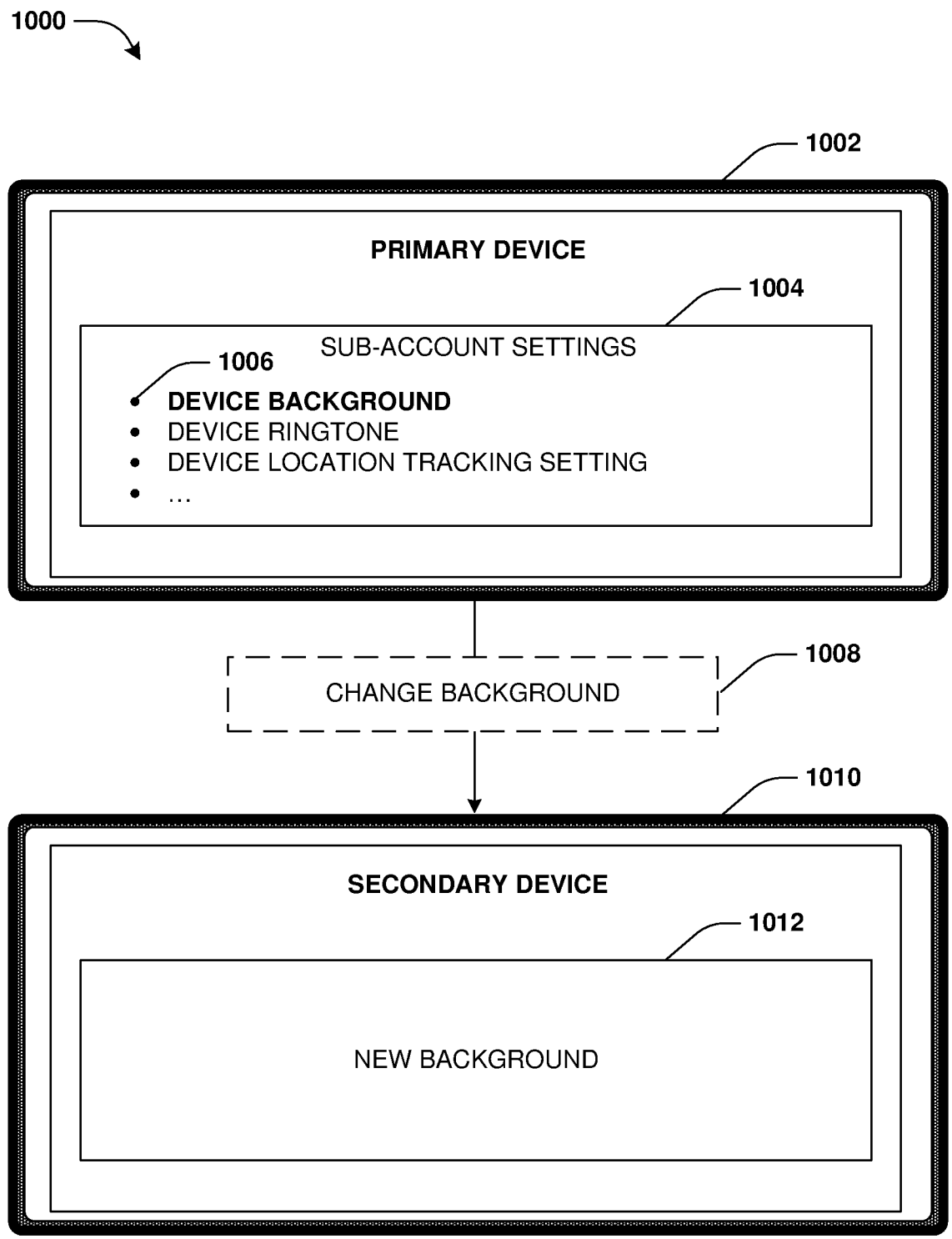
FIG. 10 is a component block diagram illustrating an example system for sub-account management, where a primary account accessed through a primary device can modify a sub-account accessed through a secondary device.

FIG. 10 illustrates an example of a system 1000 for sub-account management. A primary user may access a primary account with a service through a primary device 1002 (e.g., a mobile device, a wearable device, a television, etc.). The primary account may be associated with the primary device 1002 (e.g., a mobile device login for a first cellphone). The primary account may comprise and control a sub-account connected to the primary account. The sub-account may be associated with a secondary device 1010 (e.g., a mobile device login for a second cellphone).

The primary user may use the primary account through the primary device 1002 to access (e.g., in real-time while the sub-account is accessed from the secondary device 1010) content (e.g., the ability to view installed apps, executing apps, an operating system interface, and/or other content as if the primary user was the sub-account user logged into the sub-account through the secondary device 1010) and/or sub-account settings 1004. For example, the primary user may be able to access a device background setting 1006 of a background image displayed through the secondary device 1010, a ringtone setting used by the secondary device 1010, a device location tracking setting of the secondary device 1010, etc. The primary user through the primary device 1002 may modify the device background setting 1006 to change the background image of the secondary device 1010 to a new background 1012 (e.g., in real-time while the sub-account is accessed from the secondary device 1010). In this way, a change background command 1008 is sent to the secondary device 1010 (e.g., from the primary device 1002 to the secondary device 1010 or from the primary device 1002 to a service and then to the secondary device 1010) for real-time modification of the background image of the secondary device 1010 to the new background 1012 (e.g., in real-time while the sub-account is accessed from the secondary device 1010).

Figure 11:
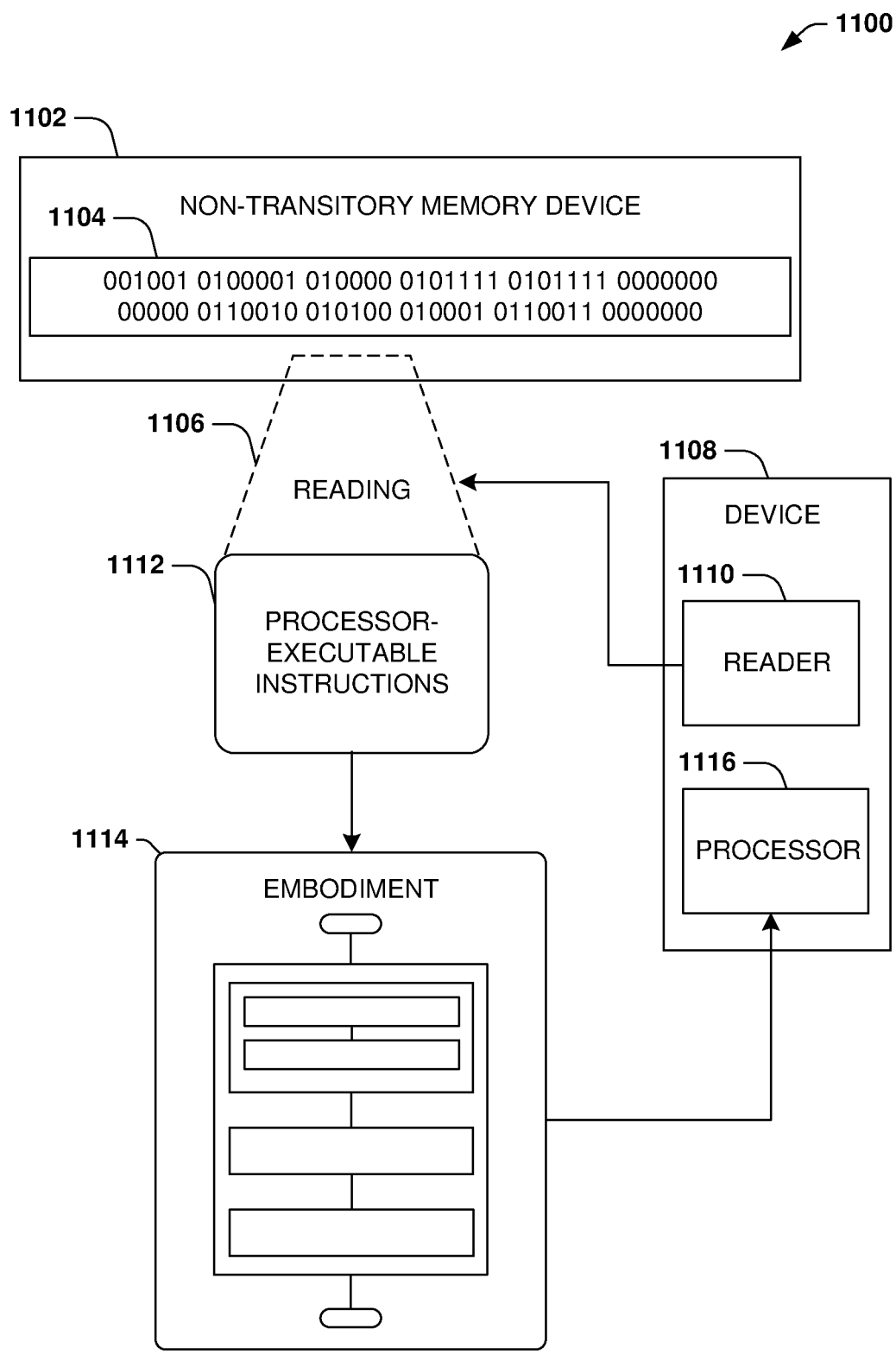
FIG. 11 is an illustration of a scenario featuring an example non-transitory machine readable medium in accordance with one or more of the provisions set forth herein.

FIG. 11 is an illustration of a scenario 1100 involving an example non-transitory machine readable medium 1102. The non-transitory machine readable medium 1102 may comprise processor-executable instructions 1112 that when executed by a processor 1116 cause performance (e.g., by the processor 1116) of at least some of the provisions herein. The non-transitory machine readable medium 1102 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 1102 stores computer-readable data 1104 that, when subjected to reading 1106 by a reader 1110 of a device 1108 (e.g., a read head of a hard disk drive, or a read operation invoked on a solid-state storage device), express the processor-executable instructions 1112. In some embodiments, the processor-executable instructions 1112, when executed cause performance of operations, such as at least some of the example method 400 of FIG. 4, for example. In some embodiments, the processor-executable instructions 1112 are configured to cause implementation of a system, such as at least some of the example system 500 of FIG. 5, at least some of the example system 600 of FIG. 6, at least some of the example system 700 of FIG. 7, at least some of the example system 800 of FIG. 8, at least some of the example system 900 of FIG. 9, and/or at least some of the example system 1000 of FIG. 10, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method of account management, the method comprising:
   executing, on a processor of a computing device, instructions that cause the computing device to perform operations, the operations comprising:
      displaying a primary account interface through a display of the computing device for a user associated with a primary account with a service;
      responsive to receiving a create command through the primary account interface to create a sub-account connected to the primary account, displaying a sub-account creation interface through the primary account interface;
      creating the sub-account connected to the primary account based upon input received through the sub-account creation interface, wherein the sub-account is part of the primary account and the primary account has control over the sub-account;
      receiving input specifying a disconnect condition through the sub-account creation interface, wherein the disconnect condition specifies that the sub-account is to be disconnected from the primary account upon satisfaction of a condition;
      associating the disconnect condition with the sub-account;
      displaying sub-account settings of the sub-account through the primary account interface; and
      responsive to receiving a value for a sub-account setting through the primary account interface, applying the value to the sub-account setting for the sub-account.

2. The method of claim 1, wherein the condition comprises at least one of a point in time, a number of logins, a weather condition, or an occurrence of an event.

3. The method of claim 1, wherein the condition corresponds to an age of a sub-account user of the sub-account.

4. The method of claim 1, wherein the operations comprise:
   responsive to determining that the condition is satisfied, disconnecting the sub-account from the primary account to create a new primary account derived from the sub-account.

5. The method of claim 4, wherein the operations comprise:
   retaining, within the new primary account, the sub-account settings and content of the sub-account with the service.

6. The method of claim 1, wherein the operations comprise:
   disconnecting the sub-account from the primary account to create a new primary account derived from the sub-account in response to a defined disconnect condition being satisfied.

7. The method of claim 1, wherein the operations comprise:
   populating the primary account interface with content of the primary account with the service; and
   displaying a sub-account interface through the primary account interface, wherein the sub-account interface is populated with content of the sub-account with the service.

8. The method of claim 1, wherein the operations comprise:
   populating the primary account interface with account activity of the sub-account with the service.

9. A computing device comprising:
a processor; and
memory comprising processor-executable instructions that when executed by the processor cause performance of operations, the operations comprising:
receiving a request from a user to create at least one primary account with a service;
displaying an account creation interface populated with primary account creation options and sub-account creation options;
creating a primary account and a sub-account connected to the primary account based upon input received through the account creation interface for the primary account creation options and the sub-account creation options;
providing the primary account with access to sub-account settings of the sub-account;
responsive to receiving a value for a sub-account setting, applying the sub-account setting to the sub-account;
receiving input specifying a disconnect condition, wherein the disconnect condition specifies that the sub-account is to be disconnected from the primary account upon satisfaction of a condition;
associating the disconnect condition with the sub-account; and
displaying one or more sub-account settings of the sub-account.

10. The computing device of claim 9, wherein the operations comprise:
providing a sub-account user with access to content of the sub-account with the service through as sub-account interface;
storing sub-account activity by the sub-account user with the content through the sub-account interface; and
providing the primary account with access to the sub-account activity.

11. The computing device of claim 9, wherein the operations comprise:
providing a sub-account user with access to content of the sub-account with the service through a sub-account interface; and
providing the user with access to the content of the sub-account with the service through a primary account interface.

12. A non-transitory machine readable storage medium having stored thereon processor-executable instructions that when executed cause performance of operations, the operations comprising:
displaying a primary account interface through a display of a computing device for a user associated with a primary account with a service;
responsive to receiving a create command through the primary account interface to create a sub-account connected to the primary account, displaying a sub-account creation interface;
creating the sub-account connected to the primary account based upon input received through the sub-account creation interface;
providing the primary account with access to at least one of content of the sub-account with the service, sub-account settings of the sub-account, or account activity of the sub-account;
receiving a request to transfer the sub-account from the primary account to a second primary account;
disconnecting the sub-account from the primary account; and
connecting the sub-account to the second primary account, wherein the sub-account is part of the second primary account, wherein the primary account has control over content and settings of the sub-account.

13. The non-transitory machine readable storage medium of claim 12, wherein the operations comprise:
displaying the primary account interface through a first mobile device of the user, wherein the primary account interface is populated with content of the primary account with the service and the sub-account settings of the sub-account;
responsive to receiving a value for a sub-account setting of the sub-account, modifying the sub-account setting with the value to create a modified sub-account setting; and
applying the modified sub-account setting to the sub-account accessed by a sub-account user through a second mobile device.

14. The non-transitory machine readable storage medium of claim 12, wherein the operations comprise:
receiving a command from the primary account through a first device.

15. The non-transitory machine readable storage medium of claim 14, wherein the operations comprise:
implementing the command to modify content associated with the sub-account accessed by a sub-account user through a second device.

16. The non-transitory machine readable storage medium of claim 12, wherein the operations comprise:
providing the second primary account with access to view content of the sub-account with the service, the sub-account settings of the sub-account, and the account activity of the sub-account.

17. The non-transitory machine readable storage medium of claim 12, wherein the operations comprise:
receiving a modification to the sub-account by a sub-account user; and
applying the modification to the sub-account to create a modified sub-account, wherein the modified sub-account is connected to the primary account.

18. The non-transitory machine readable storage medium of claim 12, wherein the service comprises at least one of an email service, a social network service, or an e-commerce shopping service.

19. The non-transitory machine readable storage medium of claim 12, wherein the service comprises a bank account service, and wherein the operations comprise:
receiving a value for a sub-account setting from the primary account, wherein the value specifies at least one of a spending limit for a bank account of the user with the bank account service, a daily withdrawal limit for the bank account, or an expiration date for use of the bank account; and
applying the value to the sub-account setting for the sub-account.

20. The non-transitory machine readable storage medium of claim 12, wherein the primary account corresponds to a first mobile device account with a first device and the sub-account corresponds to a second mobile device account with a second device.

* * * * *